(12) United States Patent
Ichikawa et al.

(10) Patent No.: US 12,501,020 B2
(45) Date of Patent: Dec. 16, 2025

(54) INFORMATION PROCESSING APPARATUS AND INFORMATION PROCESSING METHOD

(71) Applicant: SONY INTERACTIVE ENTERTAINMENT INC., Tokyo (JP)

(72) Inventors: Koji Ichikawa, Tokyo (JP); Takanori Minamino, Kanagawa (JP); Masaki Uchida, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 75 days.

(21) Appl. No.: 18/455,624

(22) Filed: Aug. 25, 2023

(65) Prior Publication Data

US 2024/0073400 A1 Feb. 29, 2024

(30) Foreign Application Priority Data

Aug. 31, 2022 (JP) .................. 2022-138197

(51) Int. Cl.
| | |
|---|---|
| H04N 13/327 | (2018.01) |
| G06T 7/80 | (2017.01) |
| H04N 13/344 | (2018.01) |
| H04N 13/366 | (2018.01) |
| H04N 13/398 | (2018.01) |

(52) U.S. Cl.
CPC ............ *H04N 13/327* (2018.05); *G06T 7/80* (2017.01); *H04N 13/344* (2018.05); *H04N 13/366* (2018.05); *H04N 13/398* (2018.05); *G06T 2207/10021* (2013.01); *G06T 2207/30196* (2013.01)

(58) Field of Classification Search
CPC .. H04N 13/327; H04N 13/344; H04N 13/366; H04N 13/398; G06T 7/80; G06T 2207/10021; G06T 2207/30196; G06T 2207/10012; G06T 7/85; G02B 2027/0138; G02B 2027/014; G02B 27/017
See application file for complete search history.

(56) References Cited

U.S. PATENT DOCUMENTS

| | | | |
|---|---|---|---|
| 11,397,465 B1* | 7/2022 | Mattila | G02B 27/0093 |
| 2016/0086306 A1* | 3/2016 | Nishimaki | G02B 27/017 |
| | | | 345/620 |
| 2018/0255285 A1* | 9/2018 | Hall | G06F 3/012 |
| 2019/0204084 A1* | 7/2019 | Song | G06T 7/579 |
| 2019/0208181 A1* | 7/2019 | Rowell | H04N 9/8205 |
| 2020/0372678 A1* | 11/2020 | Farmer | G06F 3/012 |
| 2022/0132056 A1* | 4/2022 | Zahnert | H04N 25/46 |
| 2023/0038781 A1* | 2/2023 | Ryu | G02C 11/10 |
| 2023/0222741 A1* | 7/2023 | Gruen | H04N 13/376 |
| | | | 345/633 |

* cited by examiner

*Primary Examiner* — Tracy Y. Li
(74) *Attorney, Agent, or Firm* — Kilpatrick Townsend & Stockton LLP

(57) ABSTRACT

Disclosed herein is an information processing apparatus including an image correction section that corrects a camera image captured by a camera of a head-mounted display, a state estimation section that estimates a state of an actual physical body with use of the corrected camera image, and a calibration section that causes the head-mounted display to display a guide image that represents an extraction situation of feature points from the camera image, the feature points being necessary for calibration of the camera, collects data of the feature points, performs calibration, and updates a correction parameter used by the image correction section.

14 Claims, 9 Drawing Sheets

INFORMATION PROCESSING APPARATUS AND INFORMATION PROCESSING METHOD

CROSS REFERENCE TO RELATED APPLICATIONS

This application claims the benefit of Japanese Priority Patent Application JP 2022-138197 filed Aug. 31, 2022, the entire contents of which are incorporated herein by reference.

BACKGROUND

The present disclosure relates to an information processing apparatus and an information processing method for processing data relating to a head-mounted display.

An image displaying system is widespread with which a user wearing a head-mounted display can appreciate a target space from a free point of view. For example, electronic content is known which implements virtual reality (VR) by setting a virtual three-dimensional space as a displaying target and causing an image corresponding to the direction of the line of sight of the user to be displayed on the head-mounted display. By using the head-mounted display, it is possible to enhance the feeling of immersion in an image and also to improve the operability of an application such as a game. Also, a walkthrough system has been developed by which, when a user wearing a head-mounted display physically moves, the user can virtually walk around in a space displayed as an image.

In order to enhance the sense of presence in an image world displayed on a head-mounted display and provide high-quality experience to its user, it is demanded to appropriately change a display image in response to a motion of the user. To this end, a technology has been put into practical use by which to track a position and a posture of the head of the user by providing a stereo camera in a head-mounted display and determining a relation between an actual physical body and an image plane with use of a captured image. In the technology for obtaining information of the real world with use of a stereo camera, camera calibration performed in advance has a significant influence on the accuracy of information, and therefore, various calibration methods have been proposed (for example, refer to PCT Patent Publication No. WO2016/203988; hereinafter referred to as Patent Document 1).

SUMMARY

Even if rigorous camera calibration is performed before shipment of a head-mounted display, time-dependent change sometimes occurs with hardware depending on individual circumstances such as heat generation, vibration, a shock, or the like during operation of the head-mounted display, resulting in degradation of the accuracy of acquiring information. Therefore, it is desirable to carry out calibration suitable for a situation also in individual environments of users, but calibration is less familiar to general users, and such users frequently feel a burden in carrying out calibration. Further, depending on the environment, it is not easy to obtain an image necessary for calibration, and much time may possibly be required until calibration is completed.

The present disclosure has been made in view of such a situation as described above, and it is desirable to provide a technology that improves the efficiency of calibration of a stereo camera provided in a head-mounted display and mitigates the burden on the user.

According to an embodiment of the present disclosure, there is provided an information processing apparatus including an image correction section that corrects a camera image captured by a camera of a head-mounted display, a state estimation section that estimates a state of an actual physical body with use of the corrected camera image, and a calibration section that causes the head-mounted display to display a guide image that represents an extraction situation of feature points from the camera image, the feature points being necessary for calibration of the camera, collects data of the feature points, performs calibration, and updates a correction parameter used by the image correction section.

According to another embodiment of the present disclosure, there is provided an information processing method including correcting a camera image captured by a camera of a head-mounted display, estimating a state of an actual physical body with use of the corrected camera image, and causing the head-mounted display to display a guide image that represents an extraction situation of feature points from the camera image, the feature points being necessary for calibration of the camera, collecting data of the feature points, performing calibration, and updating a correction parameter used in the correcting.

It is to be noted that any combinations of the components described above and representations of the present disclosure where they are converted between a system, a computer program, a recording medium on which the computer program is readably recorded, a data structure, and so forth are also effective as modes of the present disclosure.

According to the present disclosure, it is possible to improve the efficiency of calibration of a stereo camera provided in a head-mounted display and mitigate the burden on the user.

DETAILED DESCRIPTION OF THE PREFERRED EMBODIMENT

Figure 1:
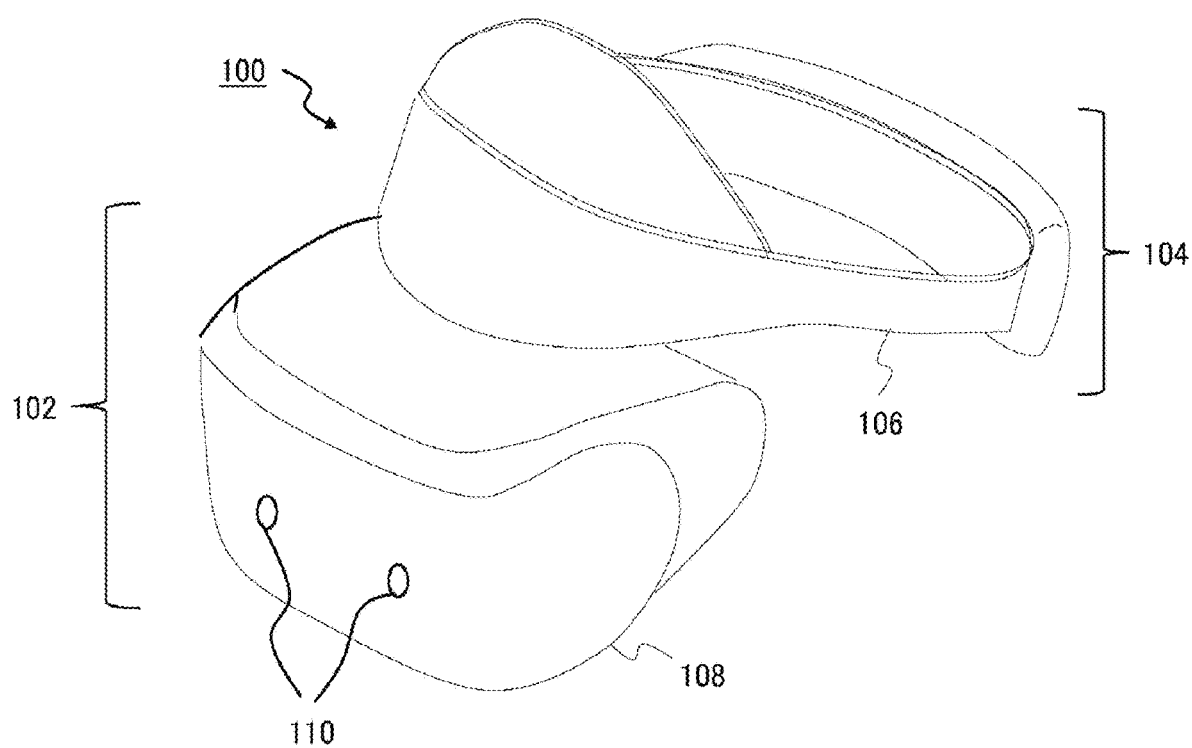
FIG. 1 is a view depicting an example of an appearance of a head-mounted display in an embodiment of the present disclosure.

In the following, an embodiment of the present disclosure is described. The present embodiment relates to an image displaying system in which an image of an application is displayed on a head-mounted display that is mounted on the head of a user. FIG. 1 depicts an example of an appearance of a head-mounted display 100. The head-mounted display 100 in the present embodiment includes an outputting mechanism section 102 and a mounting mechanism section 104. The mounting mechanism section 104 includes a mounting band 106 that goes, when the head-mounted display 100 is worn by a user, around the head of the user to implement fixation of the head-mounted display 100.

The outputting mechanism section 102 includes a housing 108 shaped such that it covers both of the left and right eyes of the user in a state in which the head-mounted display 100 is worn by the user. The outputting mechanism section 102 includes a display panel provided therein in such a manner as to directly face the eyes of the user when the head-mounted display 100 is worn. The housing 108 further includes, in the inside thereof, eyepieces that are positioned between the display panel and the eyes of the user when the head-mounted display 100 is worn and enlarge the angular field of view of the user.

The head-mounted display 100 may further include speakers and earphones at positions corresponding to the ears of the user when the head-mounted display 100 is worn. Further, the head-mounted display 100 has a motion sensor built therein such that it detects a translational motion and a turning motion of the head of the user wearing the head-mounted display 100 as well as the position and the posture of the head of the user at each time.

The head-mounted display 100 further includes a stereo camera 110 on a front face of the housing 108. The stereo camera 110 captures a moving image of the real space therearound with a field of view corresponding to the line of sight of the user. With the captured image displayed immediately, what is generally called video see-through displaying can be implemented in which a situation of the real space in the direction in which the user is facing can be seen as it is. Further, if a virtual object is drawn on a picture of an actual physical body appearing in the captured image, then augmented reality (AR) can be implemented.

It is to be noted that the arrangement of the stereo camera 110 is not limited to that depicted in FIG. 1, and the stereo camera 110 may be mounted, for example, at a lower portion of the front face of the housing 108 in such a manner as to have an angle of view directed rather downward. In this case, by converting an image captured by the stereo camera 110 into an image of the field of view in a front face direction of the user and using the converted image in displaying, video see-through displaying or AR can be implemented.

Figure 2:
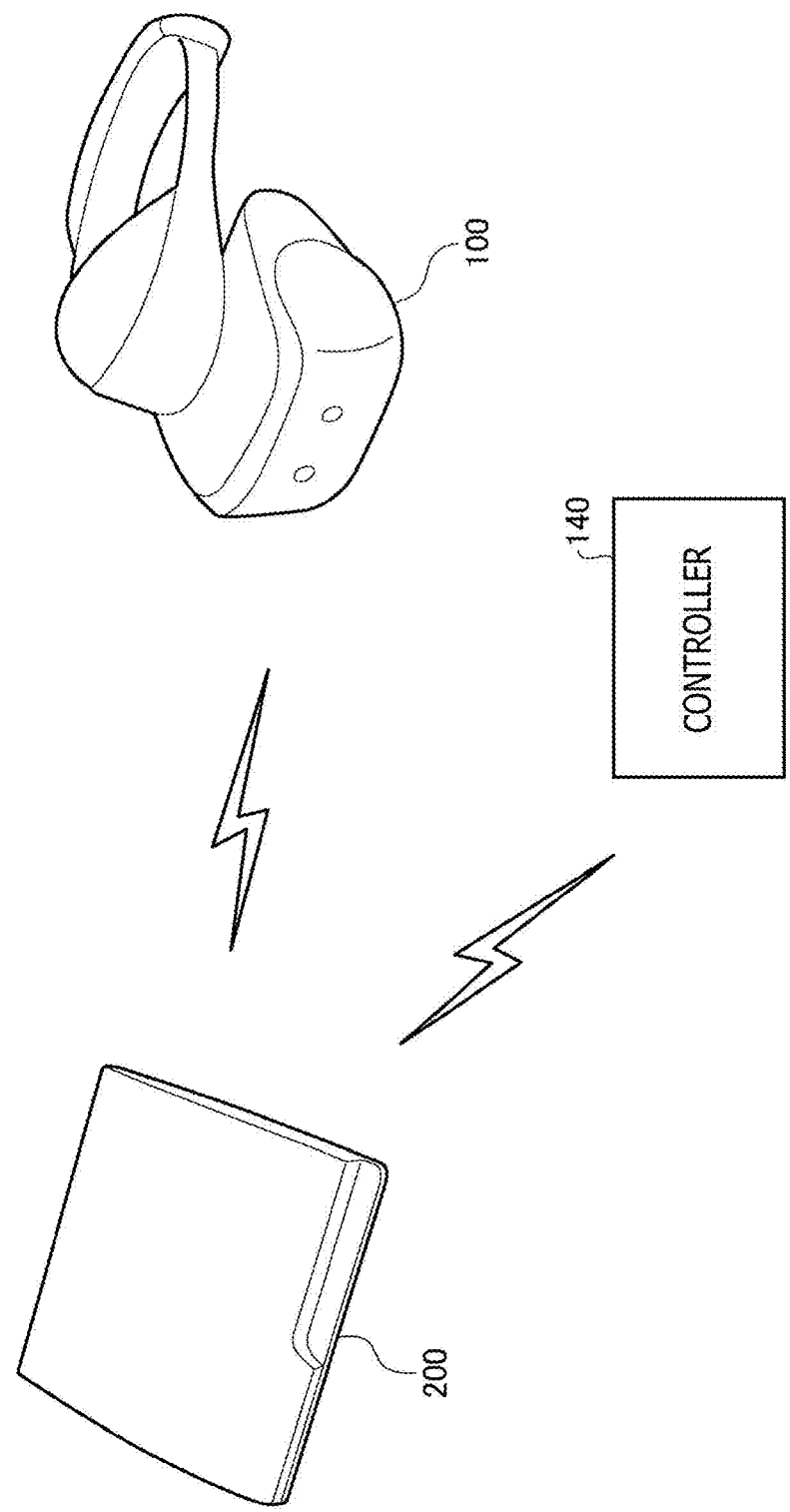
FIG. 2 is a view depicting an example of a configuration of an image displaying system in the present embodiment.

FIG. 2 depicts an example of a configuration of the image displaying system in the present embodiment. The image displaying system includes the head-mounted display 100, an image generation apparatus 200, and a controller 140. The head-mounted display 100 is connected to the image generation apparatus 200 by wireless communication. The image generation apparatus 200 may further be connected to a server through a network. In this case, the server may provide the image generation apparatus 200 with data of an online application such as a game in which a plurality of users can participate through the network.

The image generation apparatus 200 is an information processing apparatus that specifies, on the basis of the position and the posture of the head of the user wearing the head-mounted display 100, the position of the point of view and the direction of the line of sight of the user, generates such a display image as to have a field of view corresponding to the specified position and direction, and outputs the display image to the head-mounted display 100. For example, the image generation apparatus 200 may generate, as a display image, a virtual world that is a stage of an electronic game, while proceeding with the game, or may display a moving image for appreciation or information provision irrespective of a virtual world or a real world.

Further, by displaying a panorama image of a wide angle of view centered at the point of view of the user on the head-mounted display 100, it is possible to provide the user with a deep feeling of immersion in the display world. It is to be noted that the image generation apparatus 200 may be a stationary game machine or a personal computer (PC).

The controller 140 is a controller (for example, a game controller) that is grasped by a hand or hands of the user and allows inputting thereto of an operation of the user for controlling image generation by the image generation apparatus 200 or displaying of an image on the head-mounted display 100. The controller 140 is connected to the image generation apparatus 200 by wireless communication. As a modification, one of or both the head-mounted display 100 and the controller 140 may be connected to the image generation apparatus 200 by wired communication through a signal cable or the like.

Figure 3:
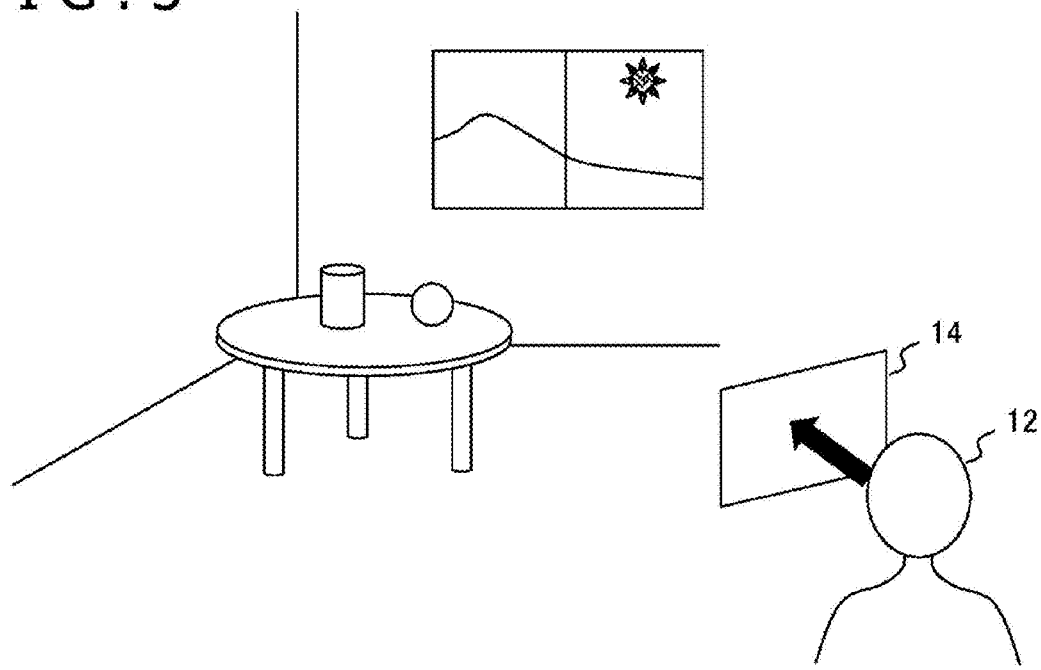
FIG. 3 is a view illustrating an example of an image world displayed on the head-mounted display by an image generation apparatus in the present embodiment.

FIG. 3 is a view illustrating an example of an image world displayed on the head-mounted display 100 by the image generation apparatus 200. In the example depicted, a state is created in which a user 12 is in a room that is a virtual space. On a world coordinate system that defines the virtual space, objects such as walls, the floor, a window, a table, and articles on the table are disposed. The image generation apparatus 200 defines a viewscreen 14 according to the position of the point of view and the direction of the line of sight of the user 12 in the world coordinate system and represents pictures of the objects on the viewscreen 14 to draw a display image.

The image generation apparatus 200 acquires the position of the point of view and the direction of the line of sight of the user 12 at a predetermined rate and changes the position and the posture of the viewscreen 14 according to the acquired position and direction. Consequently, the image generation apparatus 200 can cause the head-mounted display 100 to display an image with a field of view corresponding to the point of view of the user. Here, the image generation apparatus 200 may generate stereo images having a parallax. If the stereo images are displayed in left and right regions of the display panel of the head-mounted display 100, then the user 12 can stereoscopically view the virtual space. This makes it possible for the user 12 to experience such virtual reality that the user 12 feels as if the user were in a room of the display world.

Figure 4:
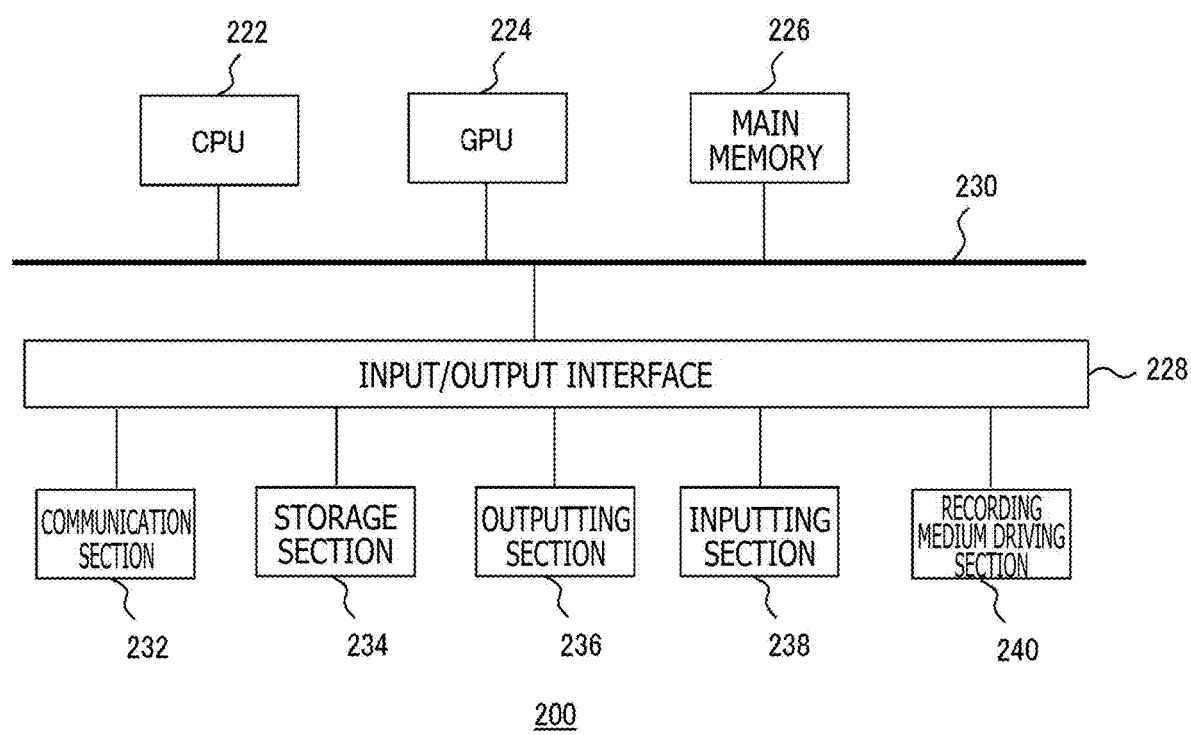
FIG. 4 is a block diagram depicting a configuration of an internal circuit of the image generation apparatus in the present embodiment.

FIG. 4 depicts a configuration of an internal circuit of the image generation apparatus 200. The image generation apparatus 200 includes a central processing unit (CPU) 222, a graphics processing unit (GPU) 224, and a main memory 226. The components mentioned are connected to one another by a bus 230. To the bus 230, also an input/output interface 228 is connected. Further, to the input/output interface 228, a communication section 232, a storage section 234, an outputting section 236, an inputting section 238, and a recording medium driving section 240 are connected.

The communication section 232 includes a peripheral equipment interface of universal serial bus (USB), IEEE1394, or the like and a network interface of a wired local area network (LAN), a wireless LAN, or the like. The storage section 234 includes a hard disk drive, a nonvolatile memory, and so forth. The outputting section 236 outputs data to the head-mounted display 100. The inputting section 238 accepts a data input from the head-mounted display 100 and further accepts a data input from the controller 140. The recording medium driving section 240 drives a removable recording medium such as a magnetic disk, an optical disk, or a semiconductor memory.

The CPU 222 controls the overall image generation apparatus 200 by executing an operating system stored in the storage section 234. Further, the CPU 222 executes various programs (for example, a VR game application or the like) that are read out from the storage section 234 or a removable recording medium and loaded into the main memory 226 or that are downloaded through the communication section 232. The GPU 224 has a function of a geometry engine and a function of a rendering processor, performs a drawing process according to a drawing command from the CPU 222, and outputs a result of the drawing to the outputting section 236. The main memory 226 includes a random access memory (RAM) and stores programs and data necessary for processing.

Figure 5:
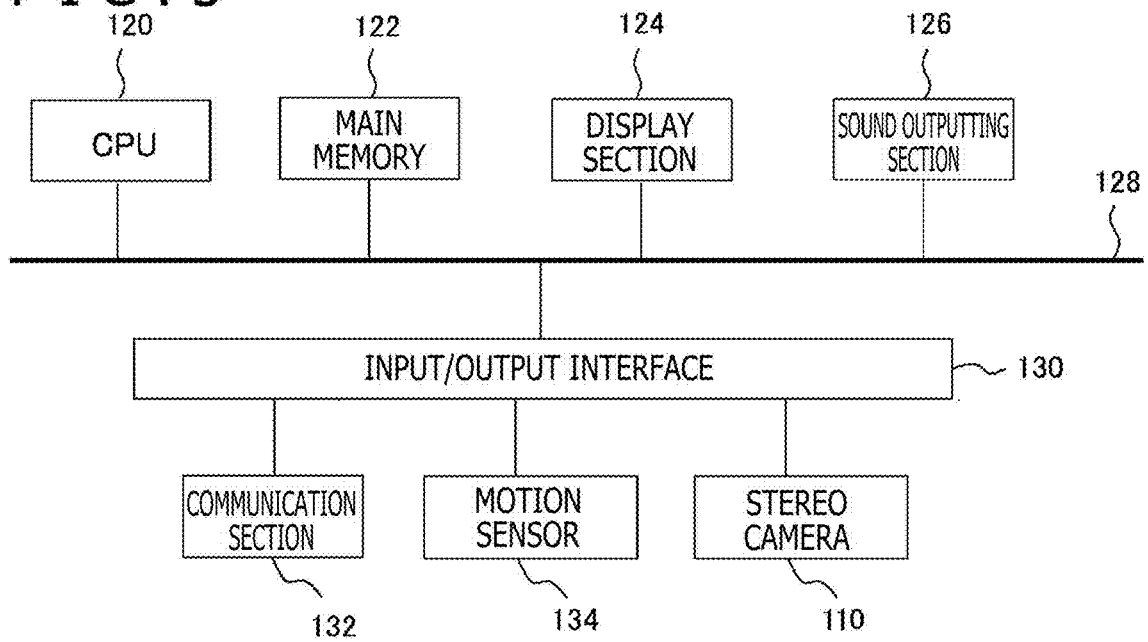
FIG. 5 is a block diagram depicting a configuration of an internal circuit of the head-mounted display in the present embodiment.

FIG. 5 depicts a configuration of an internal circuit of the head-mounted display 100. The head-mounted display 100 includes a CPU 120, a main memory 122, a display section 124, and a sound outputting section 126. The components mentioned are connected to one another by a bus 128. To the bus 128, also an input/output interface 130 is connected. To the input/output interface 130, a communication section 132 including an interface for wireless communication, a motion sensor 134, and a stereo camera 110 are connected.

The CPU 120 processes information acquired from the respective components of the head-mounted display 100 via the bus 128 and supplies the display section 124 and the sound outputting section 126 with data of a display image and sound acquired from the image generation apparatus 200. The main memory 122 stores programs and data necessary for processing of the CPU 120.

The display section 124 includes a display panel such as a liquid crystal panel or an organic electroluminescent (EL) panel and displays an image in front of the eyes of the user wearing the head-mounted display 100. The display section 124 may implement stereoscopic vision by displaying a pair of stereo images in regions corresponding to the left and right eyes of the user. The display section 124 may further include a pair of lenses that are positioned between the display panel and the eyes of the user when the user wears the head-mounted display 100 and that enlarge the angular field of view of the user.

The sound outputting section 126 includes speakers and earphones provided at positions corresponding to the ears of the user when the head-mounted display 100 is worn, and emits sound to the user. The communication section 132 is an interface for transferring data to and from the image generation apparatus 200 and implements communication by a known wireless communication technology such as Bluetooth (registered trademark). The motion sensor 134 includes a gyro sensor and an acceleration sensor and thus acquires an angular speed and an acceleration of the head-mounted display 100.

The stereo camera 110 is a pair of video cameras that capture an image of a surrounding real space from left and right points of view with a field of view corresponding to the point of view of the user as depicted in FIG. 1. An image captured by the stereo camera 110 and reflecting the surrounding space of the user is hereinafter referred to also as a "camera image." Measurement values by the motion sensor 134 and data of captured images (camera images) by the stereo camera 110 are transmitted to the image generation apparatus 200 through the communication section 132.

In the present embodiment, the image displaying system executes a tracking process of tracking a motion of the user wearing the head-mounted display 100 and causes the head-mounted display 100 to display an image of an application whose field of view is changed on the basis of a result of the tracking process. Here, the image displaying system acquires the position and the posture of the head-mounted display 100 at a predetermined rate, by using a relation between feature points of an actual physical body appearing in a camera image and position coordinates of the actual physical body in the three-dimensional space.

For example, the image displaying system utilizes a known technology such as simultaneous localization and mapping (SLAM) to track the position and the posture of the head-mounted display 100. Alternatively, the image displaying system may integrate information obtained from a camera image by using the technology and measurement values by the motion sensor 134 to determine the position and the posture of the head-mounted display 100 with a high degree of accuracy.

Figure 6:
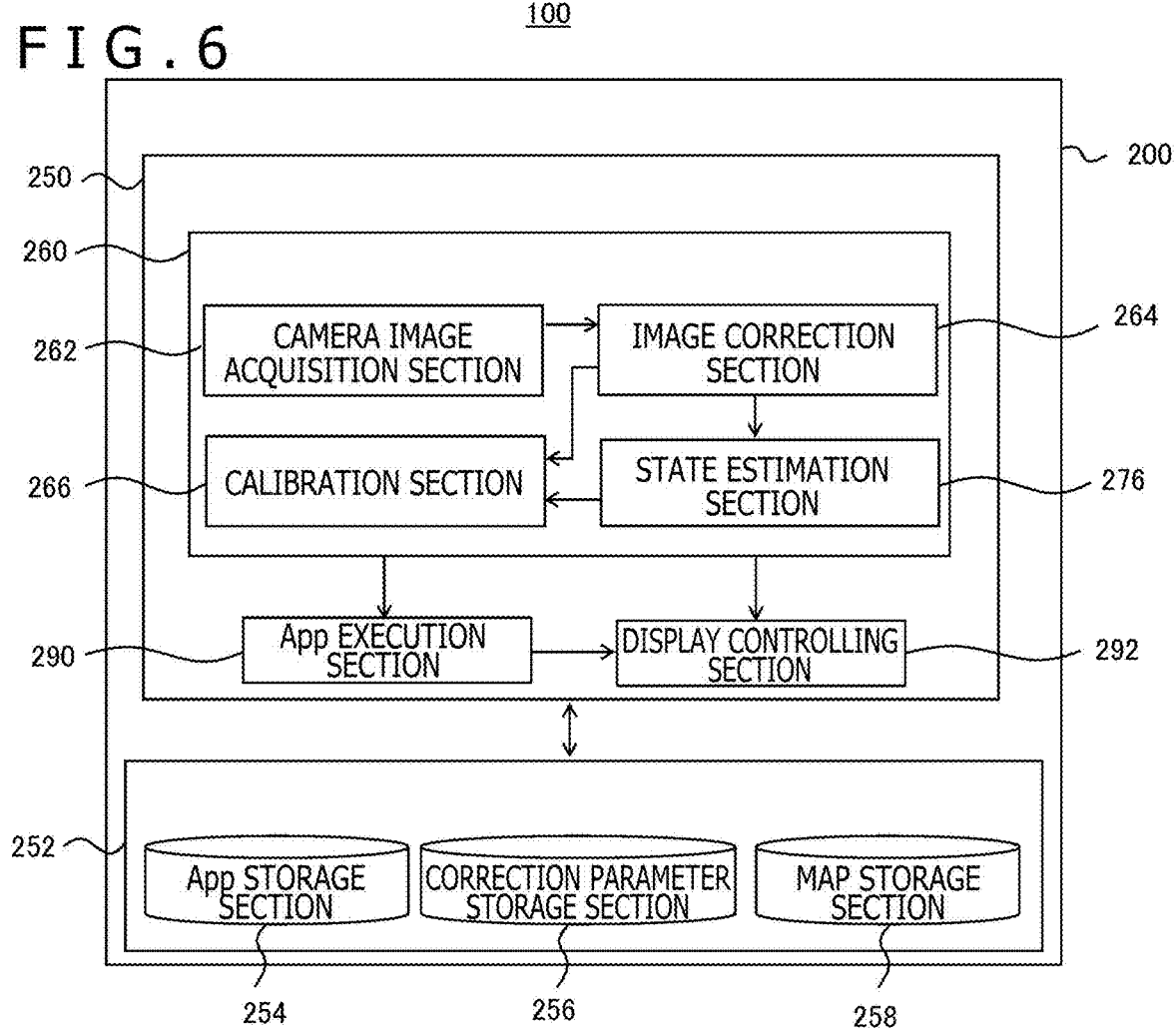
FIG. 6 is a block diagram depicting functional blocks of the image generation apparatus in the present embodiment.

FIG. 6 is a block diagram depicting functional blocks of the image generation apparatus 200. Although the image generation apparatus 200 executes general information processing such as progress of an application, communication with a server, and so forth as described above, FIG. 6 specifically depicts functional blocks relating to information acquisition using a camera image in detail. It is to be noted that at least some of the functions of the image generation apparatus 200 depicted in FIG. 6 may be incorporated in a server connected to the image generation apparatus 200 through a network or may otherwise be incorporated in the head-mounted display 100.

Further, the functional blocks depicted in FIG. 6 can be implemented in terms of hardware from such components as the CPU 222, the GPU 224, the main memory 226, and the storage section 234 as depicted in FIG. 4, and can be implemented in terms of software from a computer program in which the functions of the plurality of functional blocks are incorporated. Accordingly, it can be recognized by those skilled in the art that the functional blocks can be implemented in various forms only from hardware, only from software, or from a combination of hardware and software, and this is not restrictive.

The image generation apparatus 200 includes a data processing section 250 and a data storage section 252. The data processing section 250 executes various data processes. The data processing section 250 performs transfer of data to and from the head-mounted display 100 and the controller 140 through the communication section 232, the outputting section 236, and the inputting section 238 depicted in FIG. 4. The data storage section 252 stores data to be referred to or updated by the data processing section 250.

The data storage section 252 includes an App storage section 254, a correction parameter storage section 256, and a map storage section 258. The App storage section 254 stores data of an application such as a VR game. The correction parameter storage section 256 stores a parameter for image correction obtained as a result of calibration of the stereo camera 110. The correction parameter includes a conversion equation or a conversion matrix derived from internal parameters unique to the left and right cameras and an external parameter between the cameras.

The map storage section 258 stores map data for estimating the position and the posture of the head-mounted display 100 as well as the position and the posture of the head of the user. The map data in the present embodiment is data that associates a map representative of a distribution of feature points extracted from a camera image in a three-dimensional space and a key frame with each other. The key frame is an image that is generated on the basis of the camera image and that includes a predetermined number or more of feature points. With each key frame, a position and a line-of-sight direction of the head-mounted display 100 at the time when the key frame is captured are associated.

The data processing section 250 includes a system section 260, an App execution section 290, and a display controlling section 292. The functions of these functional blocks may be incorporated in a computer program. The CPU 222 and the GPU 224 of the image generation apparatus 200 may implement the functions of the above-described functional blocks by reading out the computer program from the storage section 234 or a storage medium to the main memory 226 and executing the computer program.

The App execution section 290 reads out data of an application selected by the user from the App storage section 254 and executes the application. The App execution section 290 generates an execution result of the application according to the position and the posture of the head-mounted display 100 as well as the position and the posture of the head of the user that are estimated by the system section 260 (a state estimation section 276 hereinafter described).

The display controlling section 292 transmits data of various images (for example, a VR image and an AR image) generated by the system section 260 and the App execution section 290 to the head-mounted display 100 such that the images are displayed on the display section 124 (display panel) of the head-mounted display 100. It is to be noted that the display controlling section 292 may transmit data of sound to the head-mounted display 100 such that the sound is outputted from the sound outputting section 126 of the head-mounted display 100.

The system section 260 executes processing of the system relating to the head-mounted display 100. The system section 260 provides a plurality of applications (for example, a VR game) for the head-mounted display 100 with a common service. The common service includes correction of a camera image, generation of map data, estimation of a position and a posture of the user, and calibration of the stereo camera 110. The system section 260 includes a camera image acquisition section 262, an image correction section 264, the state estimation section 276, and a calibration section 266.

The camera image acquisition section 262 acquires, at a predetermined rate, camera images that are captured by the stereo camera 110 and are transmitted from the head-mounted display 100. The image correction section 264 corrects the camera images by using a correction parameter stored in the correction parameter storage section 256. While the contents of the correction may be varied, especially in the present embodiment, the correction includes correction for stereo parallelization (stereo rectification) of the left and right camera images.

In the stereo-parallelized left and right camera images, an epipolar line appears on a horizontal line positioned at an equal height in the respective image planes. In particular, in the left and right camera images, a feature point (hereinafter referred to as a corresponding point) representative of the same point on an actual physical body normally appears on a horizontal line at the same height, and the corresponding relation between a picture in an image and an actual physical body can be acquired efficiently with high accuracy.

The state estimation section 276 estimates a state of an actual physical body, particularly, at least one of the position and the posture of the head of the user in the real world, using camera images having been corrected by the image correction section 264. For example, the state estimation section 276 extracts feature points of corners, edges, and so forth of a picture of the actual physical body from one of the left and right camera images. A known extraction filter or algorithm can be utilized for extraction of feature points. Then, the state estimation section 276 sets a search range in the other camera image for each of the extracted feature points and performs block matching to detect a pair of corresponding points, namely, a pair of corresponding feature points.

Since the camera images are in a stereo-parallelized state, the state estimation section 276 can restrict the search range for block matching and can derive corresponding points efficiently with fewer errors. Then, the state estimation section 276 determines, on the basis of a deviation amount between the positions of the corresponding points in the left and right camera images, three-dimensional position coordinates of a point on the actual physical body surface represented by the deviation amount by the principle of triangulation.

Further, the state estimation section 276 collates the determined three-dimensional position coordinates with the map data stored in the map storage section 258 to derive the position and the posture of the stereo camera 110 as well as the position and the posture of the head of the user at the time when the original camera images are captured. As described hereinabove, the state estimation section 276 may integrate the derived result with the measurement value by the motion sensor 134 provided in the head-mounted display 100 to determine an estimation result of the final position and posture.

The calibration section 266 carries out calibration taking a time-dependent deviation between the left and right cameras into consideration and updates the correction parameter stored in the correction parameter storage section 256 as occasion demands. Here, the time-dependent deviation signifies, for example, a time-dependent change arising in a difference in pitch angle, a difference in yaw angle, and a difference in roll angle between the left and right cameras as well as in a scale ratio of the left and right camera images. The parameters mentioned are hereinafter referred to as time-dependent deviation parameters.

If the value of any of the time-dependent deviation parameters changes, then even if the image correction section 264 corrects the camera images, corresponding points in the left and right camera images are deviated from each other in a vertical direction and a horizontal direction. As a result of the deviation, wrong corresponding points are detected or detection of corresponding points is disabled, and the deviation further affects the accuracy of acquiring the three-dimensional position coordinates by triangulation. Consequently, the accuracy of information of the position and the posture of the user is degraded eventually. To cope with this problem, the calibration section 266 monitors the deviation amount in the vertical direction between the corresponding points extracted from the left and right camera images and performs calibration for acquiring the latest value of the time-dependent deviation parameter as occasion demands.

Then, the calibration section 266 updates the contents of the correction parameter stored in the correction parameter storage section 256, on the basis of the latest value of the time-dependent deviation parameter. The calibration section 266 may monitor the deviation amount in the vertical direction between the corresponding points, utilizing information of the corresponding points extracted from the left and right camera images by the state estimation section 276, for the application being executed by the App execution section 290.

The calibration section 266 decides the necessity for calibration on the basis of such a predetermined condition that the deviation amount exceeds a threshold value, for example. Then, the calibration section 266 carries out calibration in a divided manner in a first stage in which the calibration is performed in parallel with execution of the application and a second stage that is performed if a preferable result is not obtained in the calibration of the first stage. Details are hereinafter described.

Figure 7:
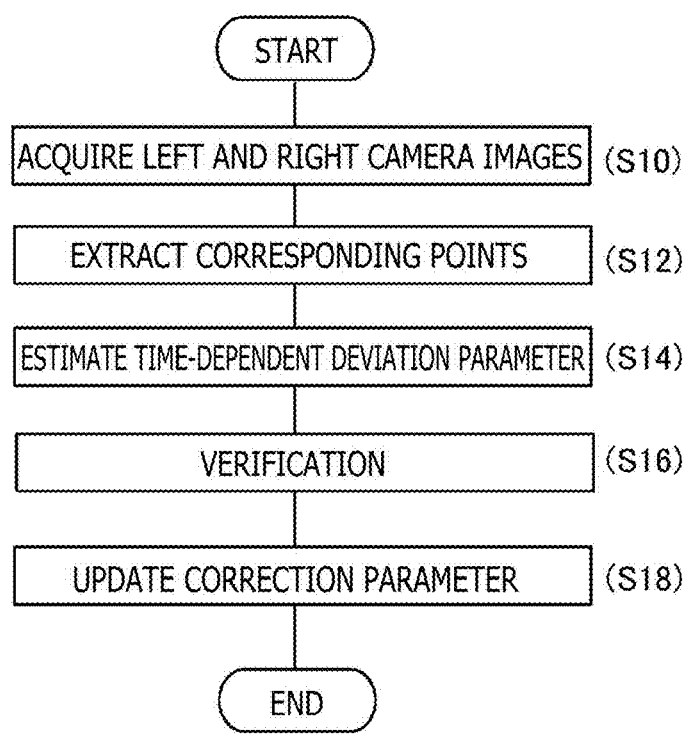
FIG. 7 is a flow chart depicting a processing procedure of calibration performed by a calibration section and so forth of the image generation apparatus in the present embodiment.

In the present embodiment, the calibration performed by the calibration section 266 is a process of acquiring the latest value of a time-dependent deviation parameter on the basis of a deviation amount between corresponding points in the vertical direction and updating the correction parameter. While, to this extent, the calibration method is not limited to any particular one, as an example, the technology disclosed in Patent Document 1 can be utilized. Since a detailed description is disclosed in Patent Document 1, an outline of it is described below. FIG. 7 is a flow chart depicting a processing procedure of calibration performed by the calibration section 266 and so forth of the image generation apparatus 200.

The camera image acquisition section 262 of the image generation apparatus 200 first acquires data of left and right camera images captured by the stereo camera 110 (S10). The camera images may each include a plurality of frames captured during a finite period of time. The state estimation section 276 or the calibration section 266 extracts corresponding points from the left and right camera images that have been stereo-parallelized (S12). The stereo parallelization is carried out by the image correction section 264 using the correction parameter before calibration.

Then, the calibration section 266 estimates such a time-dependent deviation parameter that the difference between a model formula representing the deviation amount $\Delta Y$ between corresponding points in the vertical direction with use of the time-dependent deviation parameter as a variable and an actual deviation amount is minimized (S14). The model formula of the deviation amount $\Delta Y$ at coordinates (X, Y) on the image plane is represented in the following manner.

$$\Delta Y = -(Y^2+1)\theta + (XY)\varphi - (X)\alpha + (Y)\lambda \qquad [\text{Math. 1}]$$

Here, the parameter $\theta$ is a difference between angles in a rotation direction around horizontal axes of the left and right cameras of the stereo camera 110, namely, between pitch angles. The parameter $\varphi$ is a difference between angles in a rotation direction around vertical axes of the left and right cameras, namely, between yaw angles. The parameter $\alpha$ is a difference between angles in a rotation direction around optical axis directions of the left and right cameras, namely, between roll angles. The parameter $\lambda$ is a ratio between sizes of the left and right camera images.

It is assumed that the coordinates of corresponding points in the left and right camera images are $(X_L, Y_L)$ and $(X_R, Y_R)$, respectively. The calibration section 266 calculates the sum E of squares of the residue between the deviation amount $\Delta Y$ on the model formula and the actual deviation amount at coordinates $(X_M, Y_M)$ of a midpoint between the coordinates $(X_L, Y_L)$ and $(X_R, Y_R)$ in regard to all corresponding points as follows.

$$E = \Sigma((Y_L - Y_R) - (-(Y_M^2+1)\theta + (X_M Y_M)\varphi - (X_M)\alpha + (Y_M)\lambda))^2 \qquad [\text{Math. 2}]$$

The calibration section 266 estimates the time-dependent deviation parameter that minimizes the sum E of squares of the residue, by using a general nonlinear least square method such as, for example, the Levenberg-Marquardt method. It is to be noted that the calibration section 266 may select a parameter that has a high degree of influence on the extraction accuracy of corresponding points or a parameter that indicates a great time-dependent deviation from among time-dependent deviation parameters, and determine the selected parameter as an estimation target while eliminating any other time-dependent deviation parameter from the calculation. Further, as disclosed in Patent Document 1, only a parameter that is anticipated to have high estimation accuracy may be made an estimation target according to a distribution of corresponding points obtained from the camera images.

Then, the calibration section 266 performs verification of verifying whether or not the estimated time-dependent deviation parameter is appropriate (S16). The verification is a process of statistically checking whether or not the difference between the deviation amount $\Delta Y$ on the model formula when the estimated time-dependent deviation parameter is substituted into the model formula and the actual deviation amount has a value proximate to 0. The calibration section 266 uses, for example, the difference between the deviation amount $\Delta Y$ on the model formula and the actual deviation amount as a variable and generates a histogram representative of the number of corresponding points at which such differences are obtained.

When the number of corresponding points at which the difference is within a predetermined range from 0 corresponds to equal to or higher than a predetermined ratio to the number of all corresponding points, the calibration section 266 decides that the estimated time-dependent deviation parameter is appropriate. In the case where it is decided that the time-dependent deviation parameter is appropriate, the calibration section 266 derives a new correction parameter by using this time-dependent deviation parameter and updates the data stored in the correction parameter storage section 256 (S18). Consequently, the image correction section 264 can thereafter generate camera images having a less deviation therebetween in the vertical direction by performing image correction using the new correction parameter.

Figure 8:
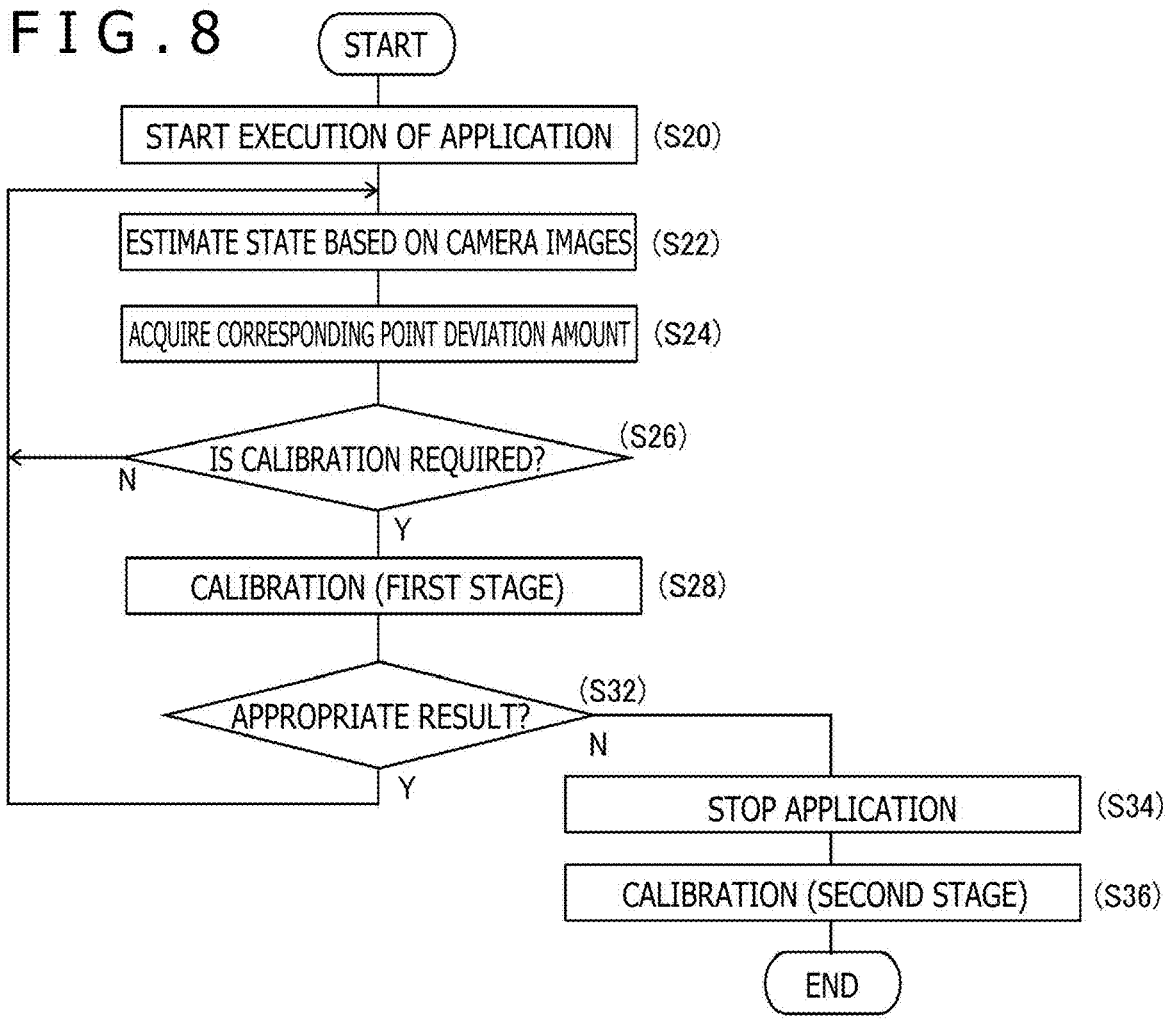
FIG. 8 is a flow chart depicting a processing procedure according to which the image generation apparatus of the present embodiment carries out calibration of a stereo camera together with execution of an application.

FIG. 8 is a flow chart depicting a processing procedure according to which the image generation apparatus 200 carries out calibration of the stereo camera 110 together with execution of an application. This flow chart is started when the user wears the head-mounted display 100 and selects a desired application by using the controller 140 or the like. In response to the selection, the App execution section 290 starts execution of the application (S20), and the camera image acquisition section 262 starts data acquisition of camera images captured by the stereo camera 110.

Then, the state estimation section 276 extracts corresponding points from the left and right camera images and acquires a positional relation of them to each actual physical body to estimate the state of the head of the user such as the position and the posture as described hereinabove (S22). Meanwhile, the calibration section 266 acquires a deviation amount between the extracted corresponding points in the vertical direction on the image plane (S24). Since a large number of corresponding points are extracted from a frame of the pair of camera images, the calibration section 266 may statistically process such deviation amounts of the corresponding points to derive an index representative of a significant deviation amount.

While a condition that necessitates calibration, such as a condition that the index of the deviation amount exceeds a threshold value, is not satisfied (N in S26), the estimation of the state by the state estimation section 276 and monitoring of the deviation amount by the calibration section 266 are continued (S22 and S24). Naturally, information of the estimated position and posture is used to generate an image representative of a result of execution of the application, and the image is outputted from the display controlling section 292 to the head-mounted display 100. However, this process is omitted in FIG. 8.

If the deviation amount between the corresponding points (or the index of the deviation amount) satisfies the condition that necessitates calibration (Y in S26), the calibration section 266 first executes calibration of a first stage (S28). The calibration of the first stage is a process called background processing that is performed in parallel with execution of the application and that is not recognized by the user while this is being carried out.

In this stage, the calibration section 266 performs calibration using the camera images transmitted from the head-mounted display 100 for execution of the application. In this case, since the user is moving while looking at a display image of VR or the like that is a result of the application, it is possible that corresponding points necessary for calibration are not obtained sufficiently.

Even in such a situation as described above, the calibration section 266 performs calibration as depicted in FIG. 7, and if an appropriate time-dependent deviation parameter is obtained (Y in S32), the calibration section 266 reflects the result of the acquisition on the correction parameter and ends the calibration of the first stage. In this case, the App execution section 290 continues the application without stopping, and the estimation of the state of the position, the posture, and so forth by the state estimation section 276 and the monitoring of the deviation amount by the calibration section 266 are continued (S22 and S24).

On the other hand, if an appropriate time-dependent deviation parameter is not obtained by the calibration of the first stage (N in S32), the calibration section 266 causes the App execution section 290 to stop execution of the application (S34) and executes calibration of a second stage (S36). At this time, the calibration section 266 may cause the head-mounted display 100 to display a message indicating that calibration is required, to notify the user of the requirement.

Further, since it is necessary for the calibration of the second stage to be performed with cooperation of the user, the calibration section 266 may, in practice, start calibration of the second stage in response to a calibration starting operation performed by the user. Also, in regard to stopping of the application, the App execution section 290 may stop execution of the application on the condition that a stopping operation is performed by the user.

Also, in the calibration of the second stage, the calibration section 266 may perform the calibration according to the processing procedure depicted in FIG. 7. It is to be noted that, in this stage, the calibration section 266 collects camera images until sufficient corresponding points are obtained in a necessary region in the image plane. This makes it possible to obtain the sum E of squares of the residue of the deviation amounts between the corresponding points with high accuracy and increase the possibility that the time-dependent deviation parameter may correctly be estimated.

In the calibration of the second stage, since the application is stopped, displaying by the head-mounted display 100 basically is video see-through displaying. When the user turns to face an appropriate direction, data of camera images suitable for the calibration is obtained. If an appropriate time-dependent deviation parameter is obtained by the calibration of the second stage, the calibration section 266 reflects this result on the correction parameter and ends the calibration of the second stage.

Figure 9:
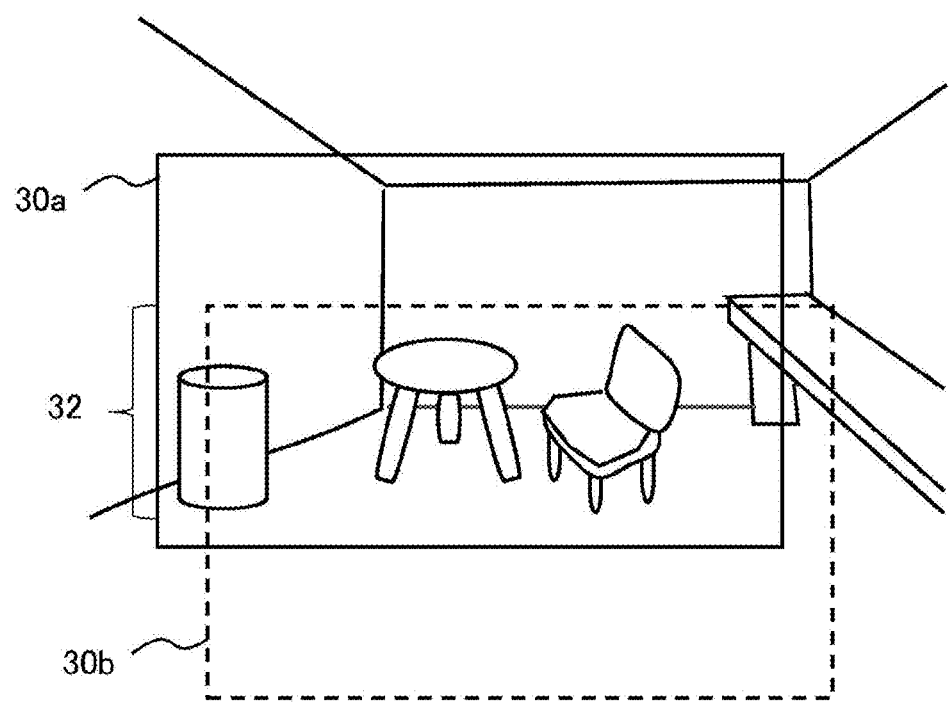
FIG. 9 is a view illustrating a relation between a distribution of corresponding points on an image plane and calibration accuracy in the present embodiment.

FIG. 9 is a view illustrating a relation between the distribution of corresponding points on the image plane and the calibration accuracy. FIG. 9 schematically depicts a space in a room in which a user wearing the head-mounted display 100 is. It is assumed that, in the space, one of the fields of view of the left and right camera images is a field 30a of view.

In the field 30a of view, such articles as a chair and a table appear in a lower half region 32, and articles having a uniform and large face such as a wall and a ceiling appear in the other regions. In this case, corresponding points extracted from a camera image of the field 30a of view and another camera image paired with this camera image are distributed one-sidedly in the lower half region 32. According to the model formula of the deviation amount $\Delta Y$ given hereinabove, the degree of the influence of each time-dependent deviation parameter on the deviation amount $\Delta Y$ has a distribution that differs depending upon the parameter on the image plane.

Therefore, in order to estimate the time-dependent deviation parameter with high accuracy, it is desirable to extract corresponding points evenly over an overall area of the image plane and incorporate data of corresponding points over a wide range into calculation of the residue of the deviation amount. Since the residue of the deviation amount is calculated in regard to position coordinates on the image plane as described hereinabove, if the field of view is changed and data of corresponding points is collected in a direction of time, the residue of the deviation amount can be obtained in regard to position coordinates over a wide range.

In the example of FIG. 9, if the user turns to face rather downward to change the field of view of the camera image from the field 30a of view to another field 30b of view, many corresponding points can be extracted also from the upper half region of the image plane. To move a picture relative to the field of view and acquire corresponding points at individual points on the image plane is hereinafter referred to as "collection of corresponding points."

Meanwhile, even if a video see-through image is generated on the basis of camera images as described above and is presented to the user, it is possible that the user is not certain regarding which direction to face and that collection of corresponding points does not progress. Therefore, in the present embodiment, the calibration section 266 superimposes, in the calibration of the second stage, a guide image on the video see-through image (hereinafter referred to simply as a see-through image) to support a motion of the user, so that corresponding points can be collected efficiently. The guide image is an image in which an extraction situation of corresponding points is represented by a two-dimensional distribution with respect to the field of view of the see-through image.

Figure 10:
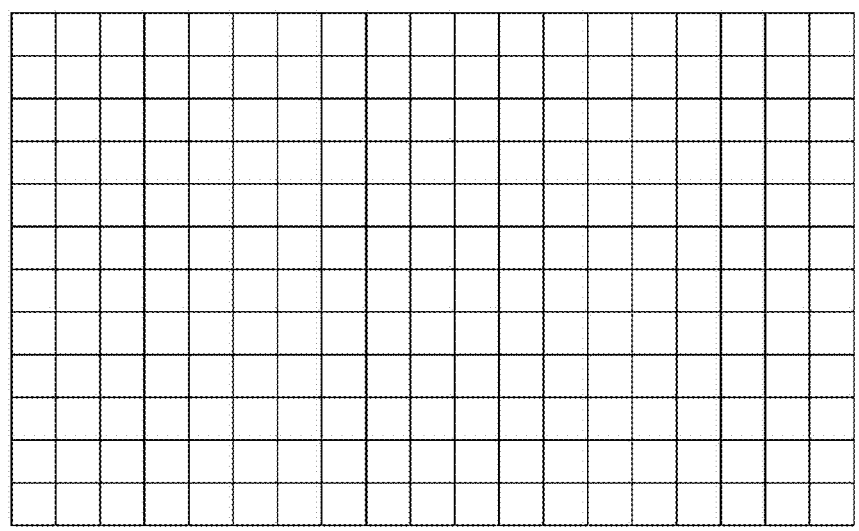
FIG. 10 is a diagrammatic view exemplifying a basic structure of a guide image to be superimposed on a see-through image by the calibration section in the present embodiment.

FIG. 10 exemplifies a basic structure of a guide image to be superimposed on a see-through image by the calibration section 266. The guide image 40 has a size sufficient to cover the entire see-through image or a region of a predetermined range of the see-through image and includes small regions (each hereinafter referred to as a grid) obtained by dividing the overall region into a predetermined number. The number of grids is, for example, approximately 10 to 30 in both the horizontal direction and the vertical direction. It is to be noted that, while, in FIG. 10, boundary lines of the grids are depicted, such boundary lines may not be represented in an actual guide image.

Further, while FIG. 10 depicts, assuming a field of view of a rectangle having its longitudinal direction aligned with the horizontal direction, one guide image 40 to be superimposed on the field of view, the guide image 40 may be, in practice, superimposed on each of see-through images for the left eye and the right eye that have a substantially the same dimension in both the horizontal direction and the vertical direction. In this case, the guide image 40 includes, for example, 16×16 grids or 28×28 grids.

It is to be noted that, in a case where the head-mounted display 100 has eyepieces, distortion according to distortion aberration or chromatic aberration is applied to a see-through image beforehand, so that an image free from distortion when it is viewed through the eyepieces is visually recognized. In this case, the calibration section 266 superimposes the guide image 40 after it applies similar distortion also to the guide image 40. Consequently, such grids of an orthogonal system as depicted in FIG. 10 are visually recognized by the user.

The calibration section 266 uses an opaque (0% transparency) filled image of a predetermined color as the guide image 40 in its initial state and gradually increases the transparency in a unit of a grid every time corresponding points are extracted. By coloring the guide image 40 with a color that is rarely seen in the real space such as red or orange, the possibility of confusion of the guide image 40 with a see-through image can be suppressed. The calibration section 266 increases, according to the number of extracted corresponding points in each grid, the transparency of the grid with a predetermined rate of increase such that the grid eventually becomes transparent at a point of time at which the number of extracted corresponding points reaches its target value.

That is, the rate of increase of the transparency is determined on the basis of the target number of extracted corresponding points. For example, in a case where the target number in each grid is set to 10, the calibration section 266 increases the transparency of the grid by 10% every time one set of corresponding points is extracted. Alternatively, the calibration section 266 may set the target number in each grid to 8 and increase the transparency of the grid by 12.5% every time one set of corresponding points is extracted. In this manner, the guide image becomes transparent beginning with a portion from which many corresponding points are collected, and the user feels such that the field of vision is gradually opened.

Figures 11A, 11B, 11C:
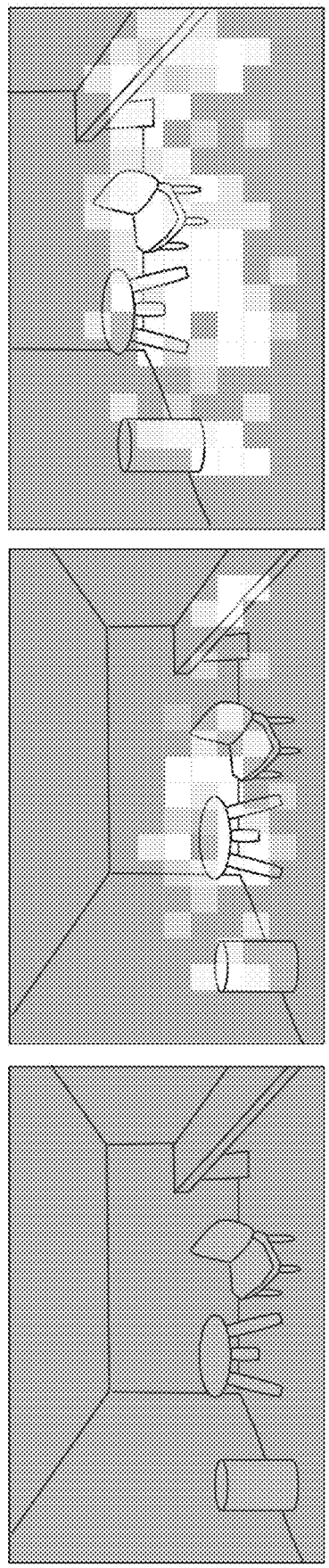
FIGS. 11A to 11C are views schematically depicting changes of a display image obtained by superimposing a guide image on a see-through image in the present embodiment.

FIGS. 11A to 11C schematically depict changes of a display image obtained by superimposing a guide image on a see-through image. First, FIG. 11A depicts a display image immediately after calibration of the second stage is started. In the display image, a see-through image representative of a situation in front of the user is covered with a guide image. It is to be noted that, while FIGS. 11A to 11C depict such that a see-through image can be seen through the guide image for the sake of clarity, the guide image may be a filled image whose transparency is 0% in practice. Alternatively, the transparency of the guide image in its initial state may be set to a value other than 0%.

FIG. 11B depicts a state in which corresponding points are extracted in a field of view same as that in FIG. 11A. In this example, it is assumed that feature points are extracted one-sidedly from the lower half region of the image plane as in the example depicted in FIG. 9. Therefore, in the guide image, the transparency gradually increases in the lower half region, and to the user, the table, the chair, and so forth begin to become visible clearly. By such a change of the guide image, the desire of the user to clearly view also the other region increases, and the possibility that the user may move the face naturally to change the field of view increases.

FIG. 11C depicts a state in which the user has thus turned the face downward a little and the range of grids having a high transparency has increased. Specifically, since the pictures of the table and the chair have relatively moved into the upper half region of the image plane while the grids whose transparency has been high in FIG. 11B remain as they are, also the grids in the upper half region of the image plane tend to increase in transparency. Since the user intentionally changes the field of view while watching the change of the guide image, the entire guide image eventually becomes transparent, and an ordinary video see-through state is entered.

It is to be noted that the target number of extracted corresponding points may be equal in all grids or may be different among the grids. For example, in grids that are included in ranges of a predetermined size in the four corners and at the center of the image plane, the ranges being regions important in calibration, the target number of extracted corresponding points may be greater than that in the other grids. Since, in a grid whose target number is great, the rate of increase of the transparency for each corresponding point extraction is small, apparently the speed at which the grid becomes transparent decreases. Where the user focuses on such regions and changes the field of view, even if the user is not conscious of the distribution of target numbers of extracted corresponding points, corresponding points are collected naturally with a preferable distribution.

The sizes of grids of the guide image may be uniform or may be different depending on the region. For example, in a region that is less important in terms of calibration, the size of the grids may be made greater than that in the other regions. Further, the transparency is not the only target to change for each grid depending upon the number of extracted corresponding points. For example, the calibration section 266 may change the color while the transparency is fixed. Alternatively, the calibration section 266 may decrease the density of design patterns such as half tone dot meshing having been displayed in an initial state, according to the number of detected corresponding points, so that the see-through image gradually becomes visible. The calibration section 266 may change two or more of the transparency, the color, and the design pattern in combination.

Figure 12:
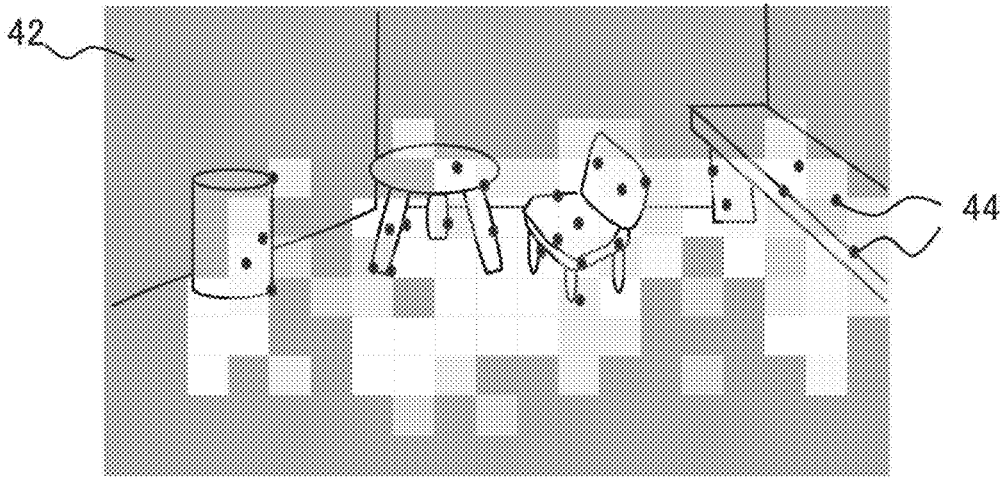
FIG. 12 is a view schematically depicting another example of the guide image in the present embodiment.

FIG. 12 schematically depicts another example of the guide image. A guide image 42 superimposed on a see-through image in the present example includes a set of grids in which the transparency increases depending on the number of extracted corresponding points as described above and objects (for example, feature point objects 44) such as dots that are represented by the extracted corresponding points and that are representative of positions on actual physical bodies. That is, while the grid set described above is represented in a state in which it sticks to the screen of the see-through image, the feature point objects are represented in a state in which they stick to pictures of actual physical bodies in the see-through image.

In a case where feature point objects are not displayed, it is possible that, when the transparency of grids has increased to a certain level, the user cannot feel such a clear change of the guide image as has noticed till then, and loses a reference point to direct its face. By visualizing feature points on actual physical bodies obtained from the corresponding points extracted already as depicted in FIG. 12, the user can obtain a reference point in a direction to direct the face, and the efficiency of collecting corresponding points can be increased. Further, the status of a work to make corresponding points spread over the entire image plane becomes clear, which enhances the willingness of the user. It is to be noted that the calibration section 266 preferably makes it possible for the user to easily distinguish grids of a guide image and feature point objects from each other by making the color of the grids and the color of the feature point objects different from each other.

Figure 13:
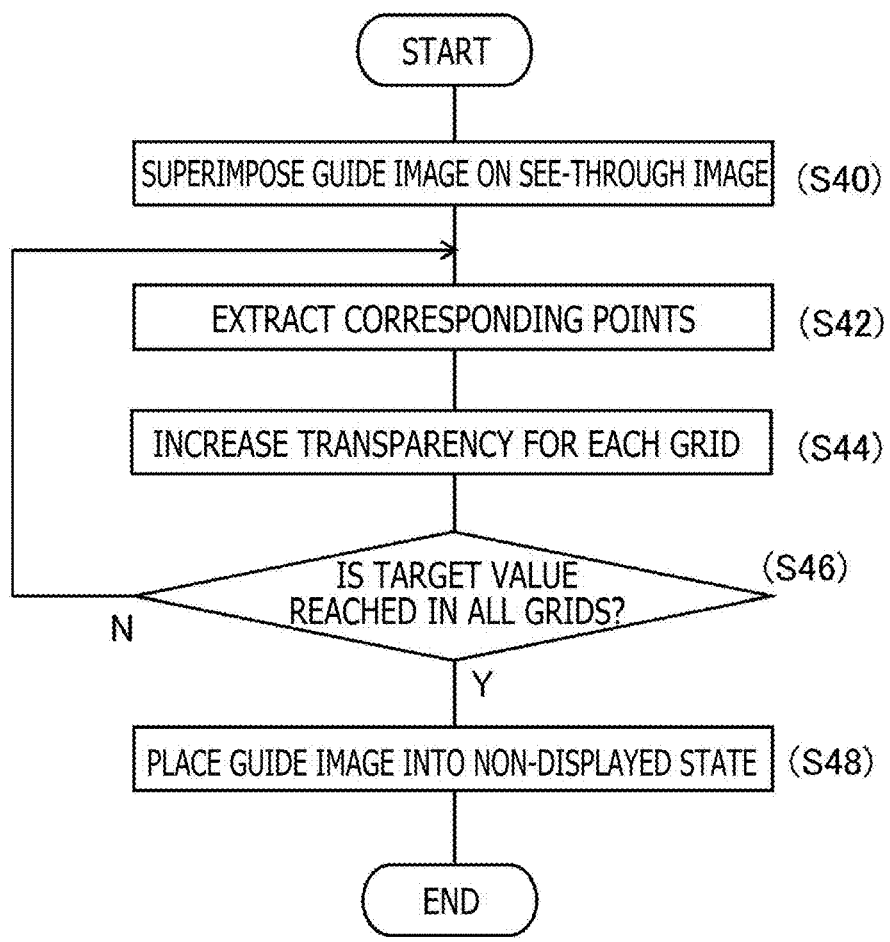
FIG. 13 is a flow chart depicting a processing procedure according to which the calibration section controls the guide image in the present embodiment.

FIG. 13 is a flow chart depicting a processing procedure according to which the calibration section 266 controls a guide image. This flow chart is executed when the extraction of corresponding points indicated in S12 of FIG. 7 is performed in the calibration of the second stage indicated in S36 of FIG. 8. First, the calibration section 266 generates a see-through image from camera images transmitted from the head-mounted display 100 and generates a display image by superimposing a guide image on the see-through image (S40). The display image is displayed on the head-mounted display 100 under the control of the display controlling section 292.

For each of the grids constituting the guide image, a target number of extracted corresponding points is set, and a rate of increase of the transparency is also set according to the target number. The calibration section 266 extracts corresponding points from the left and right camera images (S42) and increases the transparency of each grid according to the number of extracted corresponding points (S44). By this process, a change occurs in the transparency of each grid by the number of corresponding points extracted in one frame.

The calibration section 266 may include objects indicative of corresponding points into the guide image as depicted in FIG. 12. If the number of extracted corresponding points does not reach the target value in any grid (N in S46), the calibration section 266 extracts corresponding points from a next frame pair and increases the transparency of the grids according to a result of the extraction (S42 and S44). The calibration section 266 repeats a similar process for frame pairs of the left and right camera images sequentially transmitted, until after the number of extracted corresponding points reaches the target value in all the grids.

In this loop process, the user will change the field of view of the see-through image as well as the field of view of the stereo camera 110 by changing the direction of the face while viewing the guide image. Such a motion collects corresponding points, and if the number of extracted corresponding points reaches the target value (Y in S46), the calibration section 266 places the guide image into a non-displayed state and transitions to an ordinary video see-through mode (S48). It is to be noted that, since the guide image already is transparent in all the regions thereof at the point of time at which the number of extracted corresponding points has reached the target value in all the grids, no apparent change occurs.

Meanwhile, an enclosing border portion whose transparency is not changed may be provided in a peripheral region of the guide image. In this case, if the number of extracted corresponding points reaches the target value in all the grids within the enclosing border, only the enclosing border portion remains visible. Therefore, the calibration section 266 may cause the remaining enclosing border portion of the guide image to fade out into a non-displayed state in S48. In any case, the user can recognize that the calibration is progressing favorably from the fact that the guide image comes into a transparent or non-displayed state.

The embodiment described above assumes that an actual physical body like a table or a chair from which a certain number or more of feature points can be collected exists in the real space around the user. Meanwhile, it is possible that, as the number of such actual physical bodies decreases, it becomes harder to collect corresponding points even if the user changes the direction of the face while viewing the guide image, and it takes longer to obtain a corresponding point distribution necessary for calibration. Therefore, the calibration section 266 may cause an outputting apparatus such as a television receiver to display an image including many feature points such that feature points that appear in camera images are created, to thereby collect corresponding points more efficiently.

Figure 14:
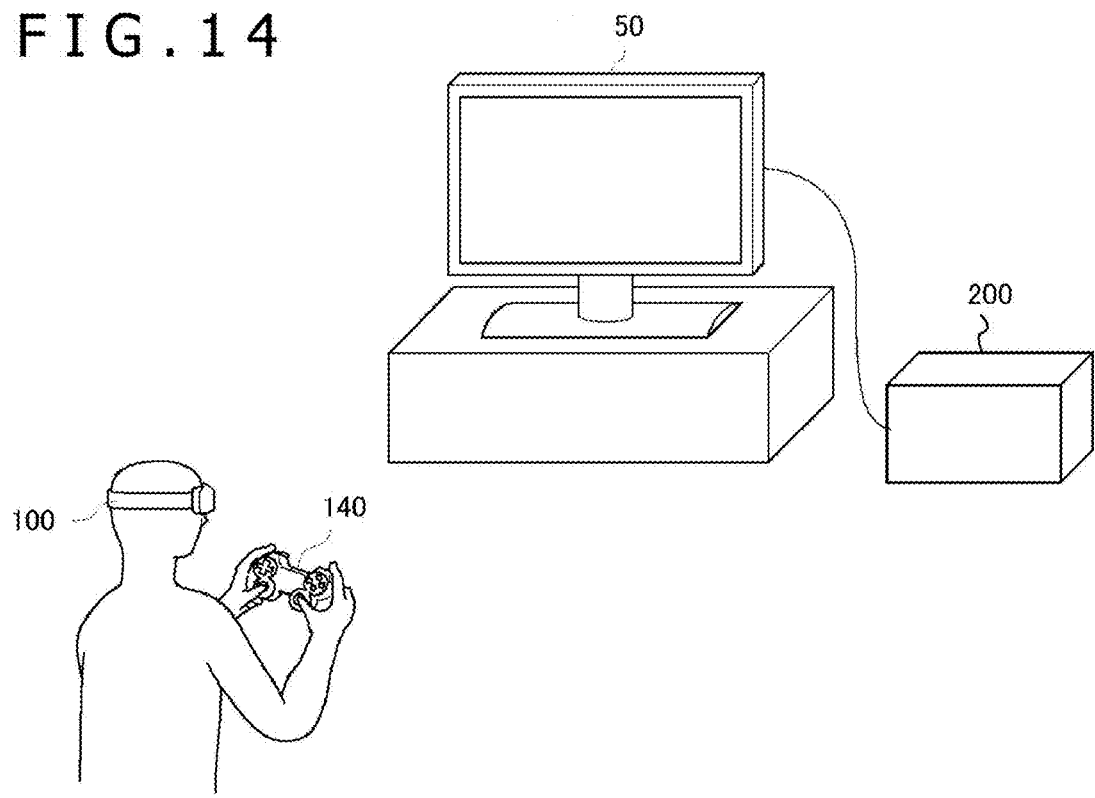
FIG. 14 is a schematic view depicting a configuration of an image displaying system that includes an outputting apparatus in the present embodiment.

FIG. 14 depicts a configuration of an image displaying system including an outputting apparatus. In this example, the image displaying system includes an outputting apparatus 50 in addition to the head-mounted display 100, the image generation apparatus 200, and the controller 140 depicted in FIG. 2. The outputting apparatus 50 is a display device different from the head-mounted display 100 and may be a stationary television receiver. The outputting apparatus 50 is connected to the image generation apparatus 200 by wireless communication or wired communication.

The outputting apparatus 50 is useful not only upon calibration but also upon execution of an application. In particular, although the outputting apparatus 50 is not necessary for the user wearing the head-mounted display 100, in a case where the outputting apparatus 50 is prepared, another user can view a display image of the outputting apparatus 50. During execution of an application such as a VR game, the image generation apparatus 200 may cause the outputting apparatus 50 to display an image same as the image being viewed by the user wearing the head-mounted display 100.

Alternatively, the image generation apparatus 200 may cause the outputting apparatus 50 to display an image different from the image being viewed by the user wearing the head-mounted display 100. For example, in a case where the user wearing the head-mounted display 100 and another user play a game together or in a like case, the outputting apparatus 50 may display a game image from a point of view of a character of the other user.

The image generation apparatus 200 in the present image displaying system has functional blocks similar to those depicted in FIG. 6. However, the calibration section 266 generates a calibration image in the calibration of the second stage and causes the calibration image to be displayed on the outputting apparatus 50 under the control of the display controlling section 292. The calibration image is an image including such a design pattern that corresponding points can easily be extracted from a camera image obtained by capturing the calibration image.

Figure 15:
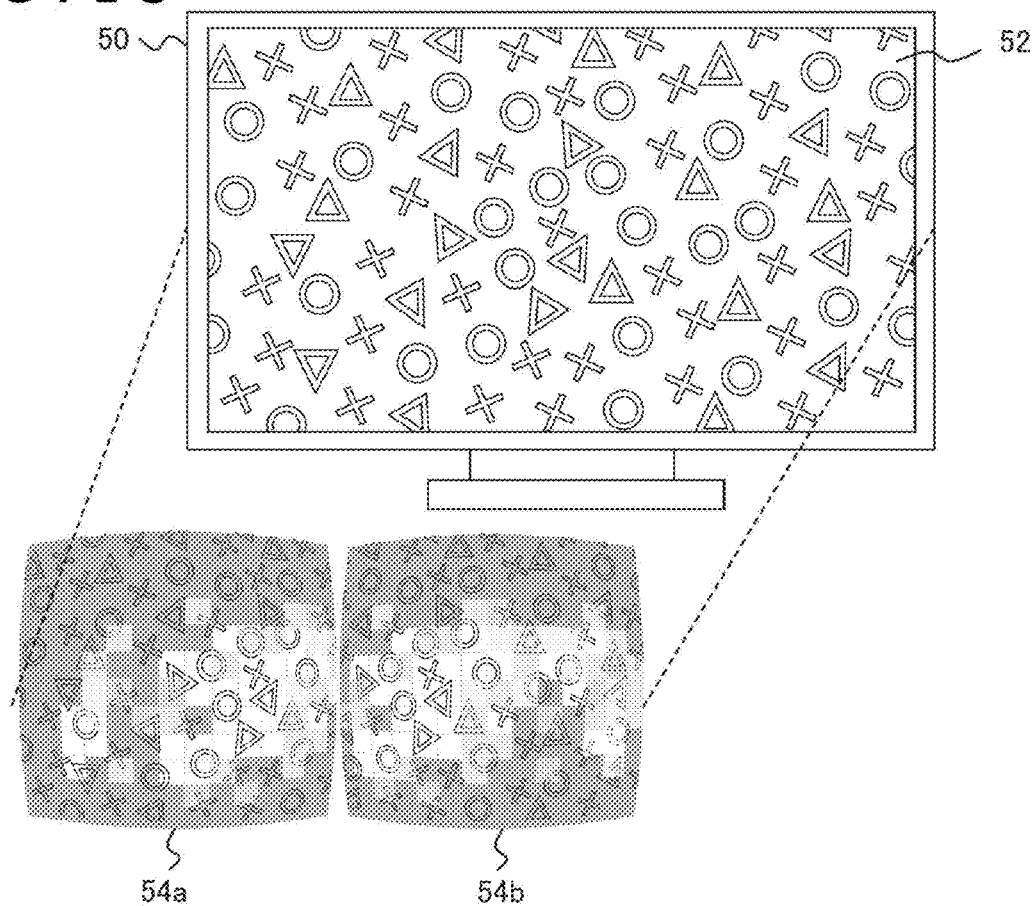
FIG. 15 is a view schematically depicting a calibration image displayed on the outputting apparatus and a see-through image displayed on the head-mounted display in the present embodiment.

FIG. 15 schematically depicts a calibration image displayed on the outputting apparatus 50 and a see-through image displayed on the head-mounted display 100. A calibration image 52 displayed on the outputting apparatus 50 is an image in which corners and edges are distributed in an overall area of the image and repetitions of a same pattern do not exist at positions close to each other. In the example of FIG. 15, the calibration image 52 is an image in which figures of a circle, a triangle, and a cross are distributed at random in terms of direction and arrangement. However, figures represented in a calibration image are not restricted to them.

Further, if the figures and the background in the calibration image 52 are represented in different colors, the accuracy of extracting corresponding points can be enhanced. If the user wearing the head-mounted display 100 turns the face toward the screen of the outputting apparatus 50, a picture of the calibration image 52 is displayed as a see-through image on the display section 124 of the head-mounted display 100. In FIG. 15, a pair of images having a parallax therebetween, that is, a left eye image 54a and a right eye image 54b, are depicted as the see-through image.

The calibration section 266 of the image generation apparatus 200 acquires left and right camera images, from which a see-through image is to be generated, from the head-mounted display 100 and extracts corresponding points from the left and right camera images. If pictures of the figures of the calibration image 52 are distributed over an overall field of view of the camera images, corresponding points necessary for calibration can be collected in a short period of time. It is to be noted that, in the example depicted, the calibration section 266 generates the left eye image 54a and the right eye image 54b in each of which a guide image is superimposed on the see-through image as in the example of FIGS. 11A to 11C.

In this case, the calibration section 266 increases the transparency of grids according to the number of extracted corresponding points in such a manner that the pictures in the calibration image 52 can gradually look clear. With this configuration, even in a state in which only part of the screen of the outputting apparatus 50 is included in the fields of view of the camera images, if the user moves the face while viewing the guide image, corresponding point collection over the entire image plane can be performed efficiently.

However, if the calibration image 52 is displayed on the outputting apparatus 50 in a video see-through state at the time of calibration of the second stage, the user will direct the face toward the calibration image 52, and it is expected that figures in the calibration image 52 appear in a region of most part of each camera image. Therefore, even if the guide image is not displayed, the possibility that corresponding point collection may be completed in a short period of time is increased with use of the calibration image 52. It is to be noted that a message for prompting the user to direct the face toward the screen of the outputting apparatus 50 may be displayed on the head-mounted display 100.

The calibration section 266 may further control the display mode of the calibration image 52 according to a situation such that corresponding points are collected efficiently with higher accuracy. For example, the calibration section 266 may adjust display luminance of the calibration image 52 according to a characteristic of luminance of the camera images. In particular, when the luminance of the camera images is low on the whole due to a reason that the ambient illuminance is low or other reasons, the calibration section 266 may control the outputting apparatus 50 to increase the display luminance of the calibration image 52.

Alternatively, the calibration section 266 may adjust display magnification of the calibration image 52 such that the picture of a figure of the calibration image appearing in each camera image has an appropriate size. Basically, as the number of feature points appearing in the camera image increases, collection of corresponding points can be completed in a shorter period of time. However, if the figure in the calibration image 52 is excessively small, the picture of it is collapsed in the camera image, and it becomes hard to extract corresponding points. In short, an appropriate range exists for the size of a figure of the calibration image 52 appearing in the camera image.

Meanwhile, the size of the figure mentioned above can variously change depending upon the screen size of the outputting apparatus 50 and the distance between the screen and the user. Therefore, the calibration section 266 extracts, for example, the picture of a figure appearing in the camera image by a known technology such as pattern matching and checks the size of the picture. Then, the calibration section 266 adjusts the display magnification of the calibration image 52 on the outputting apparatus 50 such that the picture of the figure has a size suitable for extraction of corresponding points.

As an alternative, the calibration section 266 may appropriately adjust the display magnification of the calibration image 52 on the basis of the size of the picture of the screen of the outputting apparatus 50 appearing in the camera image (or the size of the picture of the screen enclosing border). As another alternative, the calibration section 266 may successively change the display magnification of the calibration image 52 on the outputting apparatus 50 as an initial process of calibration and search for display magnification with which the greatest number of corresponding points are obtained, to determine the display magnification of the calibration image 52.

The calibration section 266 may adjust both the display luminance and the display magnification of the outputting apparatus 50 or may otherwise adjust either one of them. In any case, with the calibration image 52 displayed appropriately on the outputting apparatus 50, even in a room with few things and a uniform color, many corresponding points can be created on the camera images. As a result, the collection efficiency of corresponding points is improved, the labor of the user can be reduced, and therefore, the calibration can be completed in a short period of time.

According to the embodiment described above, in a technology for acquiring the position and the posture of a user by using a stereo camera provided in a head-mounted display, a guide image for prompting the user to make such a motion that camera images suitable for calibration of the stereo camera are obtained is superimposed on a video see-through image. The guide image is sized such that it corresponds, for example, to the field of view of the see-through image, and is such an image that the transparency of each of a predetermined number of grids obtained by dividing the guide image is increased every time corresponding points are detected and that the image becomes transparent at a point of time at which the number of detected corresponding points reaches a target value.

Consequently, the user can recognize at a glance a region in which the number of detected corresponding points is insufficient in the image plane. Further, it is possible to implement such performance on an image that a hidden region of a video see-through image gradually appears together with detection of corresponding points. From these, such a motion of the user that corresponding points can be extracted from an overall region of the image plane is promoted. As a result, while the burden on the user is mitigated, corresponding points can be collected efficiently and with high accuracy, and consequently, the calibration process can be completed in a short period of time.

Further, since a calibration image is displayed on an outputting apparatus such as a television receiver, even in an environment in which it is hard to extract corresponding points from a picture of an actual physical body, corresponding points can be collected stably. Compared with the case of using an actual physical body, with the calibration image, it is easy to set the luminance or the size of a picture appearing in the camera image to a state suitable for calibration, and therefore, by positively creating such a state, the labor of the user can further be reduced.

The present disclosure has been described in connection with the embodiment. The embodiment is exemplary, and it can be recognized by those skilled in the art that various modifications can be made in the combinations of the components and the processes of the embodiment and that also such modifications fall within the scope of the present disclosure.

What is claimed is:

1. An information processing apparatus comprising:
    a central processing unit;
    a graphical processing unit;
    a main memory;
    wherein the information processing apparatus is configured to:
        correct a camera image captured of a surrounding real space by a camera of a head-mounted display;
            wherein the camera image is from a point of view of a wearer of the head-mounted display;
        estimate a state of an actual physical body with use of the corrected camera image; and
        cause the head-mounted display to display a guide image that represents an extraction situation of feature points from the camera image, the feature points being necessary for calibration of the camera, collects data of the feature points, performs calibration, and updates a correction parameter used by the image correction section.

2. The information processing apparatus according to claim 1, wherein the information processing apparatus is configured to cause the guide image, in which the extraction situation of the feature points is represented by a two-dimensional distribution with respect to a field of view of a see-through image based on the camera image, to be displayed in a superimposed relation with the see-through image.

3. The information processing apparatus according to claim 2, wherein the information processing apparatus is configured to change a display mode for each of grids obtained by dividing the guide image, according to the number of the feature points extracted in the grid.

4. The information processing apparatus according to claim 3, wherein the information processing apparatus is configured to set an image filled with a predetermined color as the guide image and increases transparency of the grid according to the number of the extracted feature points such that the grid becomes transparent at a point of time at which the number of the extracted feature points reaches a target value.

5. The information processing apparatus according to claim 3, wherein the information processing apparatus is configured to vary a speed of change of the display mode with respect to the number of the extracted feature points among different regions of the guide image.

6. The information processing apparatus according to claim 1, wherein the information processing apparatus is configured to include, into the guide image, objects that represent positions on the actual physical body and that correspond to the extracted feature points.

7. The information processing apparatus according to claim 1, wherein, when the information processing apparatus fails to obtain an appropriate result in calibration of a first stage that is performed in parallel with execution of an application using the estimated state, the information processing apparatus is configured to perform calibration of a second stage by causing the guide image to be displayed.

8. The information processing apparatus according to claim 1, wherein the information processing apparatus is configured to cause a display apparatus different from the head-mounted display to display a calibration image including a predetermined figure and extracts the feature points from the camera image obtained by capturing the displayed calibration image.

9. The information processing apparatus according to claim 8, wherein the information processing apparatus is configured to adjust display magnification of the calibration image according to a size of a picture of the figure of the calibration image appearing in the camera image.

10. The information processing apparatus according to claim 8, wherein the information processing apparatus is configured to adjust display luminance of the calibration image according to luminance of the camera image.

11. The information processing apparatus according to claim 1, wherein the information processing apparatus is configured to correct the camera image for stereo parallelization.

12. The information processing apparatus according to claim 1, wherein the calibration comprises considering a time dependent deviation between a left camera and a right camera.

13. An information processing method comprising:
    correcting a camera image captured of a surrounding real space by a camera of a head-mounted display;
        wherein the camera image is from a point of view of a wearer of the head-mounted display;
    estimating a state of an actual physical body with use of the corrected camera image; and
    causing the head-mounted display to display a guide image that represents an extraction situation of feature points from the camera image, the feature points being necessary for calibration of the camera, collecting data of the feature points, performing calibration, and updating a correction parameter used in the correcting.

14. A computer program for a computer, comprising:
    correcting a camera image captured of a surrounding real space by a camera of a head-mounted display;
        wherein the camera image is from a point of view of a wearer of the head-mounted display;

estimating a state of an actual physical body with use of the corrected camera image; and causing the head-mounted display to display a guide image that represents an extraction situation of feature points from the camera image, the feature points being necessary for calibration of the camera, collecting data of the feature points, performing calibration, and updating a correction parameter used in the correcting.

* * * * *